(No Model.) 2 Sheets—Sheet 1.
J. M. ROSE.
PROCESS OF MANUFACTURING GAS.
No. 403,381. Patented May 14, 1889.
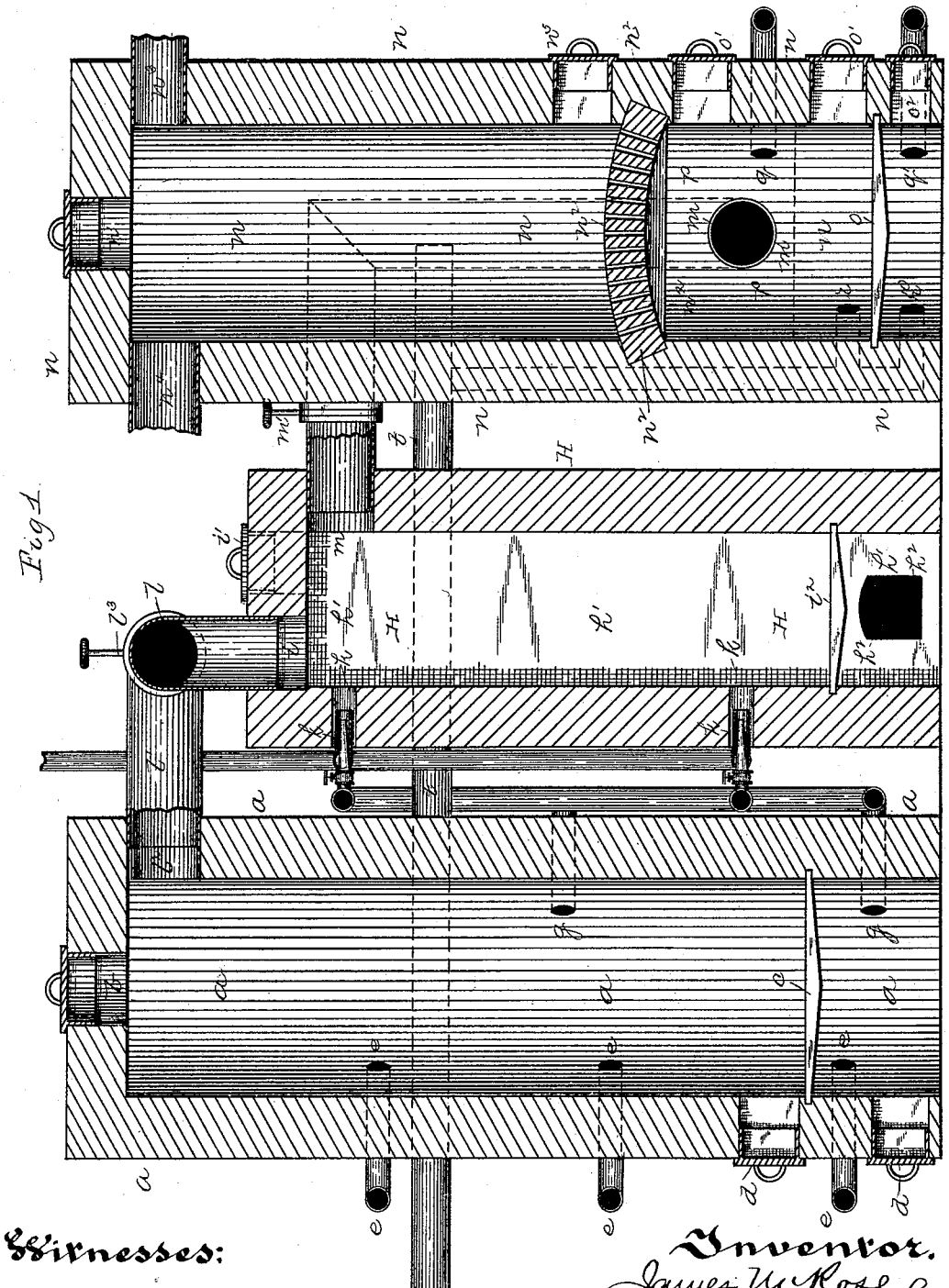

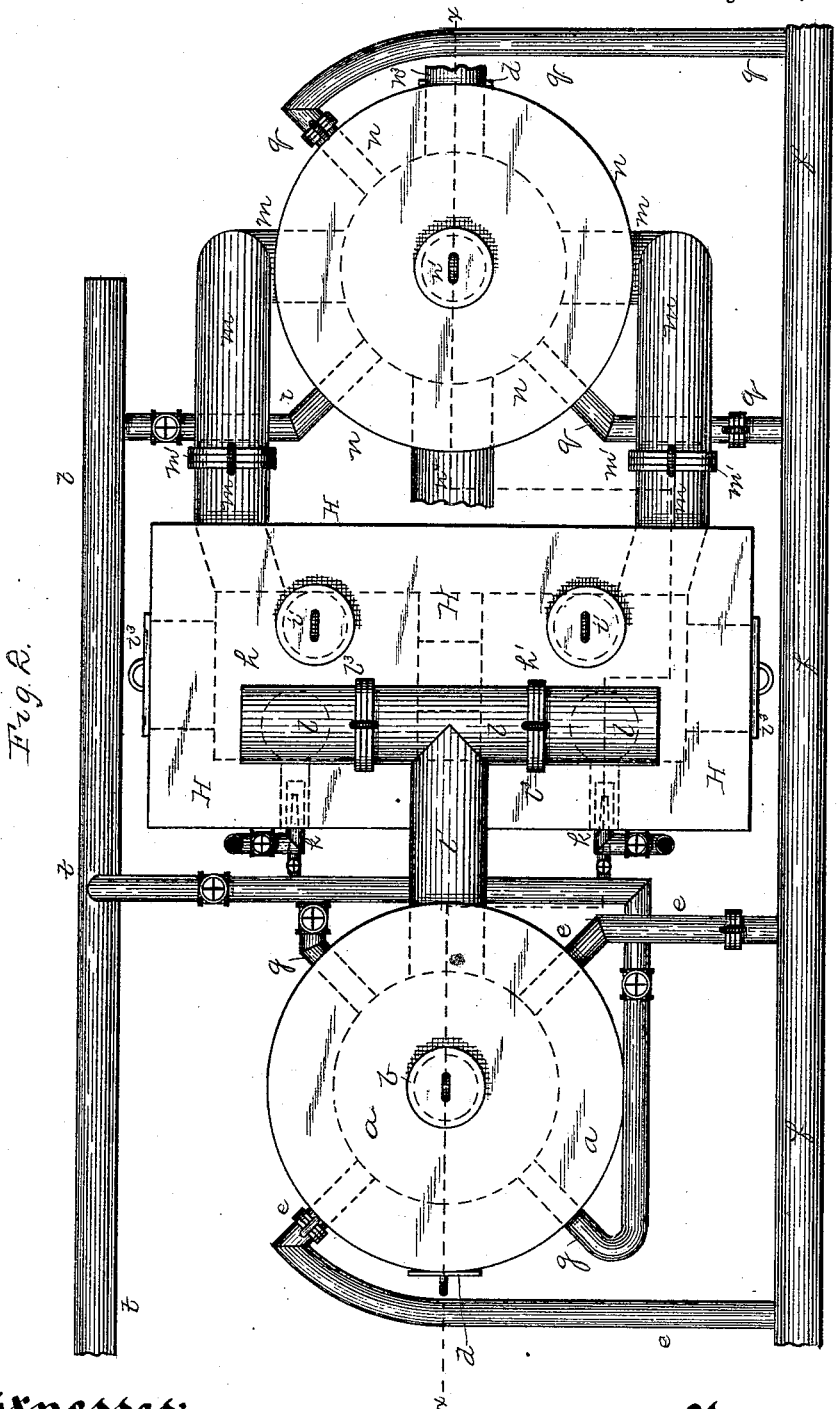

UNITED STATES PATENT OFFICE.

JAMES M. ROSE, OF ALLEGHENY, PENNSYLVANIA, ASSIGNOR, BY MESNE ASSIGNMENTS, TO THE NATIONAL HEAT AND POWER COMPANY, OF NEW JERSEY.

PROCESS OF MANUFACTURING GAS.

SPECIFICATION forming part of Letters Patent No. 403,381, dated May 14, 1889.

Application filed February 23, 1888. Serial No. 264,982. (No model.)

*To all whom it may concern:*

Be it known that I, JAMES M. ROSE, a resident of Allegheny, in the county of Allegheny and State of Pennsylvania, have invented a new and useful Improvement in the Process of Manufacturing Gas; and I do hereby declare the following to be a full, clear, and exact description thereof.

My invention relates to the manufacture of gas, and more especially to an improvement in the method or process described in an application filed by me March 2, 1887, Serial No. 229,435. In the process described in the above application a mass of limestone or other porous refractory material which is impregnated with a heavy hydrocarbon is subjected while inclosed in an air-tight chamber to the action of a current of water, gas, and steam, the limestone-chamber being preferably heated by the waste products coming from the water-gas generator, when the fuel in the latter is blown up to incandescence for the making of the water-gas. The gas obtained from this method is composed, principally, of marsh-gas, hydrogen gas, olefiant gas and carbonic oxide, and is very well adapted for fuel purposes, but is too low in candle-power to be satisfactory for illuminating purposes.

In carrying out the process described in the said application it is found that the hydrogen gas which passes from the gas-generator is to a large extent taken up by the heavy hydrocarbon supported by the limestone or other refractory material, so that the resultant gas has not a sufficient volume of hydrogen gas to form a desirable illuminating-gas.

In an application for patent filed by me on the 18th day of January, 1888, Serial No. 261,139, I have described a process of making the gas, in which a solvent for the hydrocarbon held in suspension by the refractory material enters the chambers containing the same, and thereby assists in the union between the hydrogen and heavy hydrocarbon, increasing the relative portions of the water-gas and olefiant or illuminating gas obtained in this chamber, and by such process, where a large portion of this refractory material is employed and the nascent hydrogen from the decomposition of the steam is caused to pass over a large surface of the coated or impregnated material, it is found that the proportion of marsh-gas and olefiant gas is increased, and to form a proper illuminating-gas it is desirable to increase the proportion of hydrogen gas. It is also found that where a large body of impregnated limestone is employed the force of the air-blast in the main gas-generator in raising the coal to incandescence is hardly more than sufficient to force the products of combustion therefrom through the chamber containing the impregnated material, and that the products of combustion in passing through such impregnated material lose the mass of their heat, and consequently it is desirable to form some draft to draw them through the chamber containing such material and to reheat them to cause their ignition. It is also desirable to employ some means of fixing the gas generated, in order to form a more permanent or stable gas. By my invention these difficulties in the manufacture of the gas are overcome, and I am enabled to obtain a more perfect working process and to increase the proportion of hydrogen in the gas and form the resultant gases into illuminating-gas of high candle-power.

To these ends my invention consists, generally stated, in raising the mass of coal or coke to incandescence and passing the products of combustion therefrom through a mass of refractory material containing hydrocarbon, and then burning the said products and the hydrocarbon vapors over a bed of incandescent carbon and passing the heated products therefrom through a mass of fixing material composed of dolomite or other refractory material and having solid carbon intermingled therewith to heat the same, and subsequently passing steam into said first mass of incandescent carbon and the gases formed through said refractory material and passing steam through said second bed of incandescent fuel, mixing all the resultant gases and passing them through said fixing material, as hereinafter more fully described.

It also consists in certain steps or sub-processes, as hereinafter more fully set forth and claimed.

To enable others skilled in the art to make and use my invention, I will describe the same more fully, referring to the accompanying drawings, in which—

Figure 1 is a longitudinal section on the line $x\ x$, Fig. 2; and Fig. 2 is a top view of the apparatus employed.

In practicing my invention I find the apparatus described in an application for patent filed by me on the 23d day of January, 1888, Serial No. 261,963, as well adapted for the purpose, though any suitable form of gas-making apparatus within which my invention may be carried out may, of course, be employed for such purpose. This apparatus (illustrated in the drawings) consists, generally stated, in a generator-chamber, a double limestone-chamber containing a mass of limestone or other refractory material, the two compartments of which are connected to said generator-chamber and with each other, and a combined generating and fixing chamber connected to each compartment of the limestone-chamber. The generator-chamber $a$ is provided with a charging port or ports, $b$, in the top or roof thereof for the charging of the coal or other carbonaceous fuel therein, grate-bars $c$, near the base thereof, for the support of said carbon, discharging-outlets or doors $d$, both above or below said grate-bars, for the withdrawal of the ashes, and a series of air-inlet pipes, $e$, both above and below the grate-bars, for the entrance of the air-blast employed in raising the fuel in this chamber to incandescence, these air-inlets being supplied by a suitable air-main, $f$, leading from the blower or fan. The generator-chamber $a$ is also provided with one or more steam-inlet pipes or nozzles, $g$, preferably on opposite sides, for the admission of steam into the chamber to make water-gas when the fuel has become incandescent. Contiguous to this generator-chamber, and preferably in front of the same, is placed the double chamber H, having two compartments, $h\ h'$, placed side by side, and each of said compartments is provided with a gas-inlet, $i$, preferably on the top thereof, with charging-ports $i'$, also on the top, for the charging into the compartment of the limestone or other refractory material, the grate-bars $i^2$ near the base for the support of said material, and discharging-doors $i^3$ on the side for the discharge of the same. These compartments $h\ h'$ are also each provided with steam-inlets $k$, preferably near the top and above the grate-bars for the admission of steam thereto at the proper time, these inlets being preferably in the form of an injector, which has a connection through a pipe, $t$, with a tank (not shown) containing liquid hydrocarbon. The gas-inlet $i$ of each compartment is connected to a suitable cross-pipe, $l$, which is itself connected by a pipe, $l'$, with a gas-outlet, $l^2$, in the upper part of the generator-chamber $a$, these connections between the generator-chamber and the limestone-chamber being provided with suitable valves, $l^3$, so that the products of combustion and gases coming from the generator-chamber $a$ may be carried into either compartment $h$ or $h'$. The compartments $h\ h'$ are connected together at their lower part, preferably below the grate-bars, by the flue-passage $h^2$, to permit the flow from one to the other, as hereinafter set forth, the compartments being also provided with suitable outlets, $m$, controlled by suitable valves, $m'$, for the escape of the gases therefrom. By this arrangement of the compartments of the limestone-chamber the products of combustion and gases formed in the generator can be compelled to pass down through one compartment and thence up through the other compartment, so heating the material there, and finally through the outlets $m$ of that compartment to the combined generating and fixing chamber $n$, and the course of the products of combustion and gases formed can then be reversed, passing in the opposite direction through said compartments, so that all the heat is absorbed from the products of combustion while they are passing through the two compartments of the limestone-chamber on account of the large amount of surface exposed to them, while at the same time the mass of limestone or refractory material contained in these chambers can be maintained at a substantially even heat, which is very desirable, as hereinafter more fully set forth.

The third chamber, $n$, in the apparatus is placed in front of the double chamber H and contiguous thereto, this chamber being employed for the purpose of assisting the draft through the refractory material in the double chamber, utilizing the waste products and hydrocarbon vapors discharged from said chamber in heating the refractory material, generating a further proportion of hydrogen and carbonic oxide, and fixing the gases obtained. The chamber is provided with the charging-port $n'$ in the roof for the charging of the fixing materials therein, a perforated arch, $n^2$, for the support of the fixing material, gas-outlets $n^3\ n^4$, the one for the escape of the products of combustion and the other to carry the gases formed to the holder. It is also provided with grate-bars $o$ near the base for the support of the mass or bed of coal or other carbonaceous fuel, for the purpose hereinafter described, the chamber having for the purpose of withdrawing the charge of fixing material an outlet or door, $n^5$, above the arch $n^2$, and similar outlets, $o'\ o^2$, above and below the grate-bars for the charge of fuel on said grate-bars and the withdrawal of ashes from the chamber. The space above the bed of fuel on the grate-bars and below the arch $n^2$ forms a mixing-chamber, $p$, in which the gases coming from the limestone-chambers and those generated from the bed of fuel on the grate-bars $o$ are intermingled.

Leading from each compartment $h\ h'$ of the double chamber H are the pipes $m$, which communicate with the mixing-chamber $p$ above the grate-bars $o$, so carrying any waste products or gases from the said compartments $h\ h'$ into the chamber $n$ above the bed of fuel. To supply the necessary air to mix with the products of combustion and hydrocarbon vapors as they come over from the limestone-chambers to insure the combustion of the same, one or more inlets, $q$, are arranged in the chamber $p$ above the grate-bars $o$ and below the arch $n^2$, and one or more air-inlets, $q'$, are arranged below the grate-bars to supply air for the burning of the fire on said bars, both inlets being connected with the blast-pipe $f$. Suitable steam-supply pipes or inlets, $r\ r'$, are also connected with the chamber $n$ above and below the grate-bars.

In practicing my invention the chamber $a$ is filled with coal, coke, or any suitable carbonaceous material, and the chamber H is filled with limestone, dolomite, or other suitable refractory material capable of retaining heat, this material being preferably coated with a heavy hydrocarbon, such as asphaltum or coal-tar. The chamber $n$ is provided with a bed of coal, coke, or other carbonaceous fuel on the bed $o$, and above the arch $n^2$ is placed a body of fixing material, the material preferred being dolomite, and having either intermingled therewith or arranged in alternating layers therewith a solid gas carbon— such as is obtained from the gas-retorts in the ordinary gas-distillation processes—or other equivalent carbon which will not be rapidly disintegrated. The supply-pipe $t$ communicates with a tank which contains the liquid hydrocarbon—such as petroleum or other suitable hydrocarbon which can be sprayed into the apparatus—and the chamber is also by preference provided with a like pipe with ordinary steam-connections for spraying into the chamber $a$ a suitable solvent for the hydrocarbon—such as alcohol, wood spirits, &c.—as fully described in said application, Serial No. 261,139.

It is to be noticed that the limestone-chamber H is closed, so that no air can have access thereto during the operation, as the air-supply pipes communicate only with the other chambers. The fuel in the generator $a$ is then ignited and raised by the air-blast to incandescence, the products of combustion therefrom passing through the limestone-chamber and heating the refractory material contained therein, the products of combustion passing down through one compartment thereof and up through the other compartment, so that the greater part of heat from said products of combustion is absorbed before they are discharged from this double chamber, the products of combustion being thus compelled to pass through a large body of the loose material, and the pressure and heat caused by the air-blast and combustion in the chamber being exhausted to a large extent, though the impregnated material is not raised to an exceedingly-high heat.

The mass of fuel on the grate-bars $o$ having been previously ignited, as the gases pass from the chamber H they are heated over this bed of fuel within the chamber $p$, and air is admitted both below the grate-bars and into the chambers $p$, so that the waste gases, together with any hydrocarbon vapors carried over by them, are ignited within the chamber $p$ above the bed of fuel, the heated products of combustion pass from said chamber upwardly through the perforated arch $n^2$, and raising the fixing material supported by said arch to a high heat, the draft thus created drawing or sucking the products of combustion through the mass of refractory material in the chamber $n$ and greatly assisting the draft through the same.

The refractory material in the chamber H may either be coated with the heavy hydrocarbon before its introduction into said chamber or may be coated while contained therein, as hereinafter described. In practice I prefer both to coat it before its introduction and to refresh the coating during the gas-making process, as fully set forth in an application of even date herewith, Serial No. 264,983, the manner of doing so being as follows: During the passage of the products of combustion through the chamber H through the steam-injector $k$, I spray into this chamber liquid hydrocarbon—such as petroleum— as above referred to, and in so doing a large portion of this liquid hydrocarbon is vaporized by the heat of the waste products, and is carried over as hydrocarbon vapor, with the waste products, into the chamber $n$, where it increases the body of fuel for burning therein to heat the fixing material, while the heavy portions of the hydrocarbon are deposited upon the refractory material in the chamber, and thus serve to coat the same, if it has not been previously coated, or if it has been previously coated refresh the coating of heavy hydrocarbon thereon for the purpose of making gas, as hereinafter described. The proportion of this hydrocarbon so introduced into the chamber will of course be regulated according to the amount of heavy hydrocarbon taken up from the impregnated limestone in the gas-making process and the amount of fuel for burning in the mixing-chamber desired. The necessity for the heating of the waste products of combustion passing from the chamber H is apparent, as the mass of heat thereof is absorbed in said chamber, and consequently if air only were fed to the same they would not ignite within the chamber $n$.

When the fuel in the chamber $a$ and that on the grate-bars $o$ is raised to incandescence, the air-blast is cut off, and in case the fixing material is raised to such a high heat that it might act upon the olefiant gases to decompose the same a portion of steam is first admitted under the bed of incandescent coal on the grate-bars $o$, the steam rising through said fuel and being decomposed into hydrogen and carbonic oxide, and thence passing up through the fixing material, and any carbonic acid formed absorbing from the gas-carbon contained in the fixing material a proportionate part of carbon, so that hydrogen and carbonic oxide or water gas is passed over into the gas-holder. As soon as the high heat of the fixing material is thus lowered steam is admitted to the generator $a$, and passing up through the mass of fuel therein is converted into principally free hydrogen and carbonic oxide, these gases passing into the chamber H and through the mass of refractory material therein, and the nascent hydrogen absorbing from the heavy hydrocarbons supported by the refractory material therein sufficient hydrocarbon to form a light hydrocarbon gas, such as marsh-gas or olefiant gas, the proportion of these gases formed being, of course, increased where the refractory material has been coated with heavy hydrocarbon before its introduction into said chamber, and the proportion of these gases being further increased where a solvent for the hydrocarbon—such as alcohol or wood-spirits—is introduced into the mass of refractory material as the gases are passing through the same. In this chamber a large portion of the free hydrogen is thus taken up in the formation of the marsh and olefiant gases, so that the resultant gas does not contain a sufficient body of hydrogen, and as the gas is passed over into the mixing-chamber $p$ the hydrogen and carbonic-oxide gases formed by the decomposition of the steam in the bed of coal on the grate-bars $o$ are intermingled within the mixing-chamber $p$ with the gases from the chamber H, the resultant gases passing upwardly through the fixing material, in which any carbonic acid formed absorbs a further portion of carbon, and in which the gases are united, forming a permanent or stable gas. The process is continued until the heat of the bodies of incandescent fuel is so lowered that the steam is not decomposed in passing through the same, when the steam-supply is cut off and air is again admitted into said chambers $a$ and $n$ and the process of raising the chambers to the desired heat continued as above set forth.

The gas formed by my improved process is found to contain the desired quantities of hydrogen, marsh-gas, carbonic oxide, and olefiant gas to form an illuminating-gas of high candle-power, the gas being not only rich in olefiant gas, but having the proper quantities of other gases named to cause the proper burning thereof and the formation of a highly-illuminating flame. The gas-making process can be carried on at a low cost, as substantially all the heat-units of the coal or other fuel employed in decomposing the steam are utilized in heating the chambers containing the refractory material and the fixing material, while at the same time the products of combustion and hydrocarbon vapors which pass from the chamber containing the refractory material at a low heat are raised to a high heat over a bed of coals contained in the fixing-chamber, so that substantially all of said products of combustion are burned. Where the liquid hydrocarbon is sprayed into the products of combustion, as described, the coating or impregnating of the refractory material in the second chamber is also maintained, so that the process may be continued without the necessity of introducing a fresh supply of coated refractory material into said chamber.

What I claim as my invention, and desire to secure by Letters Patent, is—

1. The herein-described process of manufacturing gas, consisting in raising a mass of coal or coke to incandescence, passing the products of combustion therefrom through a mass of refractory material containing hydrocarbon, burning said products and the hydrocarbon vapors over a second mass or bed of incandescent fuel and passing the heated products therefrom through a mass of fixing material composed of dolomite or other refractory material having solid carbon intermingled therewith to heat the same, and then passing steam into said first mass of incandescent coal and the gases formed through said refractory material, passing steam through said second bed of incandescent fuel, and mixing all the resultant gases and passing them through said fixing material, substantially as and for the purposes set forth.

2. The herein-described improvement in the manufacture of gas, consisting in blasting a mass of carbon to incandescence and passing the products of combustion therefrom through a mass of refractory material, burning the products after such passage over a second mass or bed of incandescent carbon, and passing the heated products therefrom through a mass of fixing material to heat the same, then passing steam into the first mass of incandescent carbon, the gases formed thereby through the refractory material, passing steam through the second mass of incandescent carbon, and mixing all the gases and passing them through the heated fixing material, substantially as and for the purposes set forth.

3. The herein-described steps in the manufacture of gas, consisting in heating and burning unconsumed products of combustion above a bed of incandescent fuel and passing the resultant gases through a mass of fixing material to heat the same, then passing steam through said bed of incandescent fuel, introducing combustible gas above said bed of fuel, and intermingling said gases and passing them through said heated fixing material, substantially as and for the purposes set forth.

4. The herein-described steps in the manufacture of gas, consisting in raising a bed of fuel to incandescence and passing the products therefrom through a mass of fixing material composed of dolomite or other refractory material having solid carbon intermingled therewith, and then passing steam through said bed of incandescent fuel and the resultant gas through said mass of fixing material, substantially as and for the purposes set forth.

5. As steps in the manufacture of gas, blasting a mass of carbon to incandescence and passing the products of combustion therefrom through a mass of refractory material, and then burning the products after such passage over a second mass of carbon and passing the heated products therefrom through a mass of fixing material to heat the same, substantially as and for the purposes set forth.

In testimony whereof I, the said JAMES M. ROSE, have hereunto set my hand.

JAMES M. ROSE.

Witnesses:
RICHD. S. CHILD,
ABNER J. DAVIS.